United States Patent [19]

Schmidt

[11] Patent Number: 5,122,934
[45] Date of Patent: Jun. 16, 1992

[54] HEADLIGHT FOR MOTOR VEHICLE

[75] Inventor: Hans-Joachim Schmidt, Ditzingen, Fed. Rep. of Germany

[73] Assignee: Robert Bosch GmbH, Stuttgart, Fed. Rep. of Germany

[21] Appl. No.: 686,701

[22] Filed: Apr. 17, 1991

[30] Foreign Application Priority Data

Jun. 1, 1990 [DE] Fed. Rep. of Germany ....... 4017701

[51] Int. Cl.$^5$ ............................................. B60Q 1/02
[52] U.S. Cl. ......................................... 362/61; 362/80
[58] Field of Search .................. 362/61, 80, 285, 418, 362/368

[56] References Cited

U.S. PATENT DOCUMENTS

| 4,356,539 | 10/1982 | Shanks | 362/61 |
| 4,751,619 | 6/1988 | Phillippe et al. | 362/80 |
| 4,796,165 | 1/1989 | Metti | 362/80 |
| 4,994,942 | 2/1991 | Georgeff | 362/80 |
| 5,010,456 | 4/1991 | Reichman et al. | 362/80 |

Primary Examiner—Richard R. Cole
Attorney, Agent, or Firm—Michael J. Striker

[57] ABSTRACT

A headlight for a power vehicle has a holder and a plurality of bearing points mounting the holder on a chassis part of a power vehicle. At least one of the bearing points has a holding element which is fixable on the holder or on the chassis part and a mounting element extending through the holding element and mounting the holder on the chassis part. The holder comes to abutment against the chassis part through the holding element. The holding element is fixable in different longitudinal positions for compensating tolerances of the chassis and/or the holder. The mounting element abuts against the holding element and extends through the latter with a great radial play.

13 Claims, 1 Drawing Sheet

HEADLIGHT FOR MOTOR VEHICLE

BACKGROUND OF THE INVENTION

The present invention relates to a headlight for motor vehicles.

More particularly, it relates to a headlight which has a holder which is mountable on a chassis part of a motor vehicle by several bearing points.

Headlights of the above mentioned general type are known in the art. One of such headlights is disclosed for example in the German document DE-OS 2,459,544. The headlight has a housing which is mountable on a chassis part of a vehicle. A holding element formed as a bushing is inserted in the receptacle on the rear side of the housing. The bushing is axially slotted and provided with projections on its end side. The projections engage behind the receptacle at the inner side of the housing when the bushing comes to abutment with its head against the outer side of the housing. A head screw is inserted through an opening in the chassis part, and the bushing is screwed in the head screw so as to pull the housing against the chassis part with interposition of a sealing element. Since both the chassis part and the housing have great size tolerances, a correct orientation of the headlight, especially of the light disc of the headlight to the course of the outer surface of the chassis is not guaranteed.

SUMMARY OF THE INVENTION

Accordingly, it is an object of the present invention to provide a headlight for motor vehicles which avoids the disadvantages of the prior art.

In keeping with these objects and with others which will become apparent hereinafter, one feature of the present invention resides, briefly stated, in a headlight in which the holder comes to abutment against the chassis part through a holding element, wherein the holding element is fixable in different longitudinal positions for compensation of size tolerances of the chassis part and/or the holder, and the mounting element abuts against the holding element and extends through it with a great radial play.

When the headlight is designed in accordance with the present invention it has the advantage in that a correct orientation of the headlight is possible. This results from the fact that the headlight is displaceable through the holder and the holding element relative to the chassis part and the holder comes to abutment against the chassis part through the holding element which is fixable in different positions. During a dismounting of the headlight it suffices to release only the mounting element, and during further mounting of the headlight the orientation of the headlight is insured without additional adjusting works, since the holding element does not have to be released. Moreover, an adjustment of the headlight is possible transversely to the chassis part.

In accordance with another feature of the present invention, the holding element has a portion provided with two radially opposite flattened regions and two radially opposite circular cylindrical regions with toothings, while the receptacle has two radially opposite walls with another toothing. The distance between the walls is smaller than the size of the receptacle in a perpendicular direction. The holding element in a rotary position in which its flattened regions face the toothing of the receptacle is insertable into the receptacle, and then its toothing is bringable in engagement with the toothing of the receptacle. When the headlight is designed in accordance with these features, the holding element is easily insertable into the receptacle and fixable in its by turning.

Still another feature of the present invention is that the holding element has a cylindrical portion and extends with this cylindrical portion through an opening in the receptacle toward the chassis part. With these features a reliable fixing of the holding element is achieved.

Furthermore, the holding element has a throughgoing opening with a substantially rectangular cross-section for the mounting element. In such a construction the holding element is reliably connected with the holder in such a manner that it cannot be lost.

Still a further feature of the present invention is that the receptacle has an abutment for limiting the turning of the holding element in the mounting direction. Thereby, it is insured that the holding element is reliably fixed without inspection during mounting of the headlight.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
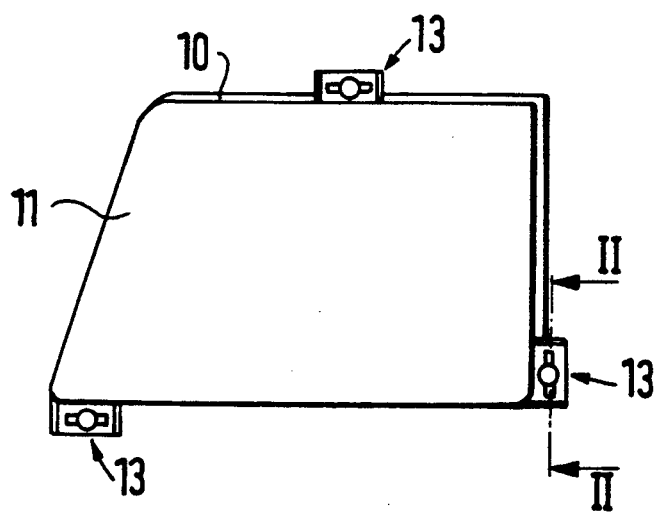
FIG. 1 is a front view schematically showing a headlight for a motor vehicle in accordance with the present invention.
Figure 2:
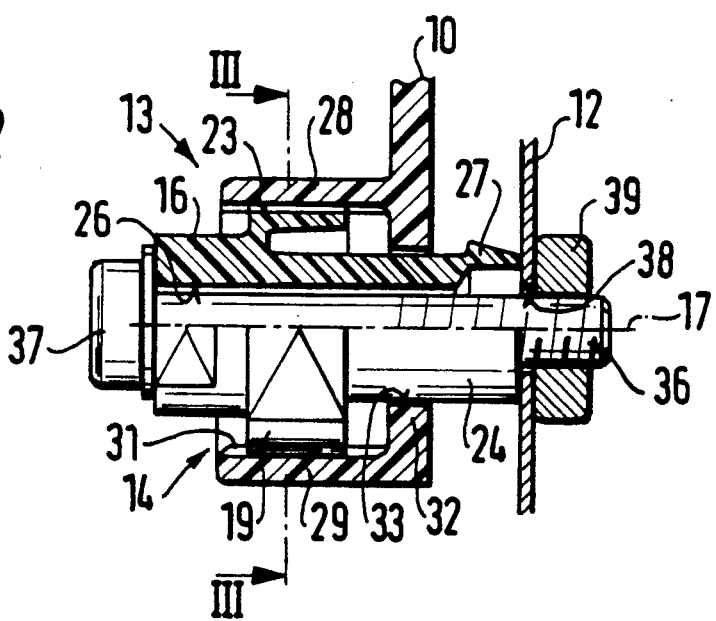
FIG. 2 is a view showing a section of the inventive headlight taken along the line II—II in FIG. 1.
Figure 3:
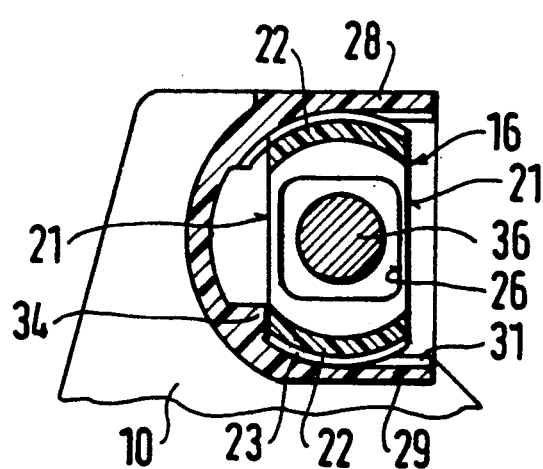
FIG. 3 is a view of a section of the inventive headlight taken along line III—III in FIG. 2.

A headlight for power vehicle shown in FIG. 1 has a housing which is identified with reference numeral 10 and composed of a synthetic plastic material. The front side of the housing is closed with a light disc 11. A not shown reflector with a light source is arranged in the housing 10.

The housing 10 serves as a holder for mounting the headlight on a chassis part, especially on a front end 12 of the power vehicle. The housing 10 is fixable on the front end 12 by several bearing points arranged on its outer walls. Three such bearings 13 are shown in the drawings. A receptacle 14 is formed in each bearing point 13 and extends outwardly from an outer wall. A bushing-type holding element 18, composed of synthetic plastic material is insertable in the receptacle 14, so that the housing 10 can come to abutment against the front end 12 substantially in direction of a longitudinal axis 17 of the power vehicle.

The holding element 16 is insertable in the receptacle 14 in direction of its longitudinal axis which is parallel to the longitudinal axis 17 of the power vehicle. In mounted condition the holding element 16 has a portion 19 located inside the receptacle 14. The portion 19 has two radially oppositely located end flattened regions 21 and two radially oppositely located circularly cylindrical regions 22 extending perpendicular to the first mentioned regions. The circularly cylindrical regions 22 are each provided on their outer sides with a straight-toothing 23 which is stepped along the longitudinal axis 17 and is radially elastically deformable. The holding element 16 has a cylindrical portion 24 connected with the portion 19 and extending toward the front end 12. The holding element 16 is provided with a throughgoing opening 26 with a substantially rectangular section. A radially elastically turnable hook 27 is formed on the free end of the portion 24.

The receptacle 14 has a U-shaped cross-section in a direction transverse to the longitudinal axis 17. The legs of the cross-section extend radially to the longitudinal axis 17 from the housing 10. The legs of the receptacle 14 are formed by two limiting walls 28 and 29. At their opposite surfaces they are each provided with a straight toothing 31 corresponding to the toothing 23 of the holding element 16. The receptacle 14 is open between the outwardly facing ends of the limiting walls 28 and 29. The receptacle can also have the cross-section shaped as an elongated hole, so that the diameter of the receptacle 14 in its central section parallel to both walls 28 and 29 is greater than the diameter in the central section perpendicular to the walls 28 and 29. The receptacle 14 has a closing wall 32 facing toward the front end 12 and arranged transversely to the longitudinal axis 17. The closing wall 32 is provided with an opening 33.

For mounting the holding element 16 is inserted into the receptacle 14 in direction of its longitudinal axis 17 in a rotary position in which its flattened regions 21 face toward the walls 28 and 29. The cylindrical portion 24 extends through the opening 33 in the closing wall 32 toward the front end 12 so that the holding element 16 is held in a rotatable manner. The hook 17 after passing through the opening 13 swings outwardly so that the holding element 16 is held in the receptacle 14 in such a manner that it cannot be lost. By turning in the mounting direction around its longitudinal axis 17, the holding element is axially fixable in the receptacle 14, and in particular so that the toothing 23 of the holding element 16 engages with the toothing 31 of the receptacle 14. The diameter of the receptacle 14 in the region of its toothing 31 is somewhat smaller than the diameter of the holding element 16 in the region of its toothing 23. Therefore the holding element 16 and/or the receptacle during fixing is radially elastically deformed and it is clamped in the receptacle 14 to prevent an unauthorized release of the holding element during further mounting of the headlight. The rotary movement of the holding element 16 is limited by its fixation through a projection 34, so that the holding element 16 cannot be turned more than 90°. The projection 34 is formed in the receptacle 14, extends radially inwardly and serves as an abutment.

A screw 36 is passed through the holding element 16 and serves as a mounting element. The screw 36 abuts with its head 37 against the end side of the holding element 16. It extends with its threaded portion through an opening 38 in the front end 12 and is mounted on the front end by a nut 39. The diameter of the screw 36 is substantially smaller than the width of the throughgoing opening 26.

During mounting of the headlight on the front end 12 the headlight is first oriented in direction of the longitudinal axis 17 of the power vehicle. In particular, the light disc 11 is for example oriented relative to the course of the outer surface of the chassis or the light beam direction of the light emanating from the headlight. In this position of the headlight the holding element 16 is fixed so that the headlight abuts against the front end 12 through the holding element. The finer the toothings 23 and 31 are subdivided, the more accurate the headlight can be oriented. The headlight in this position is held on the front end 12 by the screws 36. However, it is still adjustable transversely to the longitudinal axis 18 of the holding element 16. The reason is that the screws 36 extend through the holding element 16 with a great radial play. Therefore a height as well as side adjustment of the headlight is possible. When also the height and side adjustment of the headlight is performed, the nuts 39 are tightened and the headlight is thereby reliably held on the front end 12. During a further dismounting of the headlight, it suffices to release only the screws 36, and not the holding elements 16 which remain in their correct position in the receptacles 14. During a subsequent mounting of the headlight, it suffices to perform only the height and side adjustment, and not the adjustment of the headlight in direction of the longitudinal axis 17.

The receptacle can also be arranged on a front end, and the housing of the headlight can abut against the holding element, and the screw extending through the holding element is fixable on the housing by a nut. Moreover, the headlight can be formed as an insert headlight which is fixable on the front end by a supporting arm which serves as a holder. The receptacles are arranged in this case on the supporting arm.

It will be understood that each of the elements described above, or two or more together, may also find a useful application in other types of constructions differing from the types described above.

While the invention has been illustrated and described as embodied in a headlight for a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A headlight for a power vehicle, comprising a holder; a plurality of bearing points mounting said holder on a chassis part of a power vehicle, at least one of said bearing points having a holding element interposed between said holder and said chassis part and being fixable in different longitudinal positions relative to said holder for compensating tolerances of the chassis and/or said holder, and a mounting element extending to said holding element and mounting said holder together with said holding element on the chassis part, said holder coming to abutment against the chassis part through said holding element, said holding element being fixable in a final fixed position independent from the mounting of said holder to the chassis part which is effected by said mounting element and wherein said holder may be fixed without adjusting said holding element from its final fixed position, said mounting element abutting against said holding element and extending through the latter with great radial play.

2. A headlight as defined in claim 1; and further comprising a receptacle provided with a first toothing, said holding element having an outer periphery provided with a second toothing which is stepped in a displacement direction of said holding element and engines with said first toothing of said receptacle so as to fix said holding element.

3. A headlight as defined in claim 2, wherein said receptacle has an opening, said holding element having a cylindrical portion which extends through said opening of said receptacle.

4. A headlight as defined in claim 3, wherein said cylindrical portion of said holding element has an end region provided with a radially elastic hook which after passing of said cylindrical portion through said opening springs radially outwardly.

5. A headlight as defined in claim 1, wherein said holding element has a substantially rectangular throughgoing opening for said mounting element.

6. A headlight as defined in claim 1, wherein said holding element is composed of a synthetic plastic material.

7. A headlight as defined in claim 1, wherein said holder is composed of synthetic plastic material.

8. A headlight as defined in claim 1, wherein said holding element and said holder are composed of synthetic plastic material.

9. A headlight as defined in claim 1, wherein said holder is formed as a housing.

10. A headlight as defined in claim 1, wherein said holder is formed as a supporting frame.

11. A headlight for a power vehicle, comprising a holder; a plurality of bearing points mounting said holder on a chassis part of a power vehicle, at least one of said bearing points having a holding element and a mounting element extending through said holding element and mounting said holder on the chassis part, said holder coming to abutment against the chassis part through said holding element, said holding element being fixable in different longitudinal positions for compensating tolerances of the chassis and/or said holder, said mounting element abutting against said holding element and extending through the latter with a great radial play, a receptacle provided with a first toothing, said holding element having an outer periphery provided with a second toothing which is stepped in a displacement direction of said holding element and engages with said first toothing of said receptacle so as to fix said holding element, said holding element having a portion which is provided with two radially oppositely located flattened regions and two radially oppositely located circular cylindrical regions provided with said second toothing, said receptacle having two radially oppositely located walls provided with said first toothing and having therebetween a distance which is smaller than a distance between said walls in a perpendicular direction, said holding element in a rotary position in which said flattened regions face toward said first toothing of said receptacle being insertable into said receptacle and by turning about its longitudinal axis bringing said first toothing into engagement with said second toothing of said receptacle.

12. A headlight as defined in claim 11, wherein said receptacle has a U-shaped cross-section, said walls forming legs of said U-shaped cross-section, said receptacle being open at ends of said walls which face away of said holder.

13. A headlight for a power vehicle, comprising a holder; a plurality of bearing points mounting said holder on a chassis part of a power vehicle, at least one of said bearing points having a holding element and a mounting element extending through said holding element and mounting said holder on the chassis part, said holder coming to abutment against the chassis part through said holding element, said holding element being fixable in different longitudinal positions for compensating tolerances of the chassis and/or said holder, said mounting element abutting against said holding element and extending through the latter with a great radial play, a receptacle provided with a first toothing, said holding element having an outer periphery provided with a second toothing which is stepped in a displacement direction of said holding element and engages with said first toothing of said receptacle so as to fix said holding element, said receptacle having an abutment arranged to limit a rotation of said holding element in a mounting direction.

* * * * *